(12) United States Patent
Pan (10) Patent No.: US 10,348,510 B2
(45) Date of Patent: Jul. 9, 2019

(54) SWITCHING DEVICE AND PACKET DISCARDING METHOD (71) Applicant: ZTE Corporation, Shenzhen (CN)

(72) Inventor: Tingshan Pan, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 94 days.

(21) Appl. No.: 15/103,965

(22) PCT Filed: Jun. 20, 2014

(86) PCT No.: PCT/CN2014/080462
§ 371 (c)(1),
(2) Date: Jun. 13, 2016

(87) PCT Pub. No.: WO2015/085748
PCT Pub. Date: Jun. 18, 2015

(65) Prior Publication Data
US 2016/0294566 A1 Oct. 6, 2016

(30) Foreign Application Priority Data
Dec. 13, 2013 (CN) .......................... 2013 1 0690545

(51) Int. Cl.
H04L 12/04 (2006.01)
H04L 12/64 (2006.01)
(Continued)

(52) U.S. Cl.
CPC .......... H04L 12/04 (2013.01); H04L 12/6418 (2013.01); H04L 43/00 (2013.01);
(Continued)

(58) Field of Classification Search
CPC . H04L 45/00; H04L 29/0653; H04L 49/3009; H04L 47/10; H04L 29/06
See application file for complete search history.

(56) References Cited

U.S. PATENT DOCUMENTS 6,032,272 A * 2/2000 Soirinsuo ........... H04Q 11/0478
370/236
6,480,892 B1 * 11/2002 Levay .................... H04L 43/50
709/224
(Continued)

FOREIGN PATENT DOCUMENTS

CN 1968208 A 5/2007
CN 101051961 A 10/2007
(Continued)

OTHER PUBLICATIONS

International Search Report for corresponding application No. PCT/CN2014/080462 filed on Jun. 20, 2014; dated Sep. 30, 2014.
(Continued)

Primary Examiner — Gbemileke J Onamuti
Assistant Examiner — Sanjay K Dewan
(74) Attorney, Agent, or Firm — Cantor Colburn LLP (57) ABSTRACT Provided are a switching device applying a switching technology and a packet discarding method of the switching device, which relate to the field of Internet. The switching device includes a number of functional units and a number of ports, wherein the ports are configured to input messages to the functional units, or receive messages from the functional units and forward the received messages. The switching device further includes a discarded message collection processing unit, which includes a collection component, configured to collect messages discarded by each functional unit and port.

9 Claims, 3 Drawing Sheets (51) Int. Cl.
*H04L 12/26* (2006.01)
*H04L 12/823* (2013.01)
*H04L 12/931* (2013.01)

(52) U.S. Cl.
CPC .......... *H04L 43/08* (2013.01); *H04L 43/0876* (2013.01); *H04L 47/32* (2013.01); *H04L 49/50* (2013.01); *H04L 43/0847* (2013.01)

(56) References Cited

U.S. PATENT DOCUMENTS

| | | | | |
|---|---|---|---|---|
| 6,650,640 | B1* | 11/2003 | Muller | H04L 49/602 370/392 |
| 7,315,542 | B2* | 1/2008 | Gil | H04L 29/06 370/252 |
| 7,376,085 | B2* | 5/2008 | Yazaki | H04L 29/06 370/235 |
| 7,466,703 | B1* | 12/2008 | Arunachalam | H04L 45/00 370/351 |
| 7,512,124 | B2* | 3/2009 | Sangroniz | H04L 12/1886 370/390 |
| 7,805,535 | B2* | 9/2010 | Narsinh | H04L 47/10 370/230 |
| 8,340,092 | B2* | 12/2012 | Kaganoi | H04L 49/555 370/389 |
| 8,472,443 | B2* | 6/2013 | Enduri | H04L 49/70 370/392 |
| 8,705,353 | B1* | 4/2014 | Reddy | H04L 41/0806 370/230 |
| 8,837,493 | B2* | 9/2014 | Casado | H04L 12/4633 370/395.53 |
| 9,699,063 | B2* | 7/2017 | He | H04L 45/02 |
| 2004/0062244 | A1* | 4/2004 | Gil | H04L 29/06 370/392 |
| 2005/0157647 | A1* | 7/2005 | Sterne | H04L 63/0227 370/235 |
| 2005/0201415 | A1* | 9/2005 | Narsinh | H04L 47/10 370/469 |
| 2006/0007862 | A1* | 1/2006 | Sayeedi | H04L 47/10 370/235 |
| 2009/0064326 | A1 | 3/2009 | Goldstein | |
| 2014/0362859 | A1* | 12/2014 | Addanki | H04L 12/465 370/392 |
| 2016/0248623 | A1* | 8/2016 | Matsuura | H04Q 11/0066 |

FOREIGN PATENT DOCUMENTS

| | | | |
|---|---|---|---|
| CN | 101150493 | A | 3/2008 |
| CN | 101719850 | A | 6/2010 |
| CN | 102204164 | A * 9/2011 | .......... H04L 43/062 |
| CN | 103560923 | A | 2/2014 |
| GB | 2405004 | A | 2/2005 |

OTHER PUBLICATIONS

Editor H 248 53: "Updated Draft of New ITU-T Rec. H.248.53 (Ex H.248.TMAN) "Gateway Control Protocol:Traffice Management Packages" (for Consent)" 2009-2012 International Telecommunication Union, Geneva: CH, vol. 3/16, Nov. 18, 2008, XP017436769, pp. 36.

Supplementary European Search Report Application No. EP14869285; dated Nov. 2, 2016; pp. 29.

\* cited by examiner

SWITCHING DEVICE AND PACKET DISCARDING METHOD

TECHNICAL FIELD

The present disclosure relates to an exchange technology in the field of Internet, and in particular to a switching device and a packet discarding method.

BACKGROUND

Network equipment (such as a switch) including a switch chip is network equipment for forwarding electric signals, and it can provide a dedicated electric signal channel for any two network nodes accessing the network equipment. A switching technology is widely used in the field of Internet, but the problem of packet loss caused by switching in a network is always thorny. There are various reasons for packet loss, such as message discarding caused by a Cyclical Redundancy Check (CRC) error, message discarding caused by incapability of passing check of a Virtual Local Area Network (Vlan) and message discarding under a port congestion condition of a switch chip. Packet discarding phenomena occur highly randomly, packets are continuously discarded sometimes, and sometimes, one in a hundred thousands of packets is discarded or a few packets are discarded in a long period of time.

In a packet discarding method adopted in the related art, attentions are only paid to conditions for packet discarding and which kinds of packets are to be discarded, and if a message needs to be discarded, the message is directly discarded without any other processing. Therefore, if it is necessary to know the specific packets discarded by a switch chip and reasons for discarding these packets, high manpower and time consumptions are required to find out the discarded packets from massive messages and analyze and check the reasons for discarding these packets one by one.

Therefore, how to rapidly know specific packets discarded by a switch chip and reasons for discarding these packets is a problem to be solved in the related art.

SUMMARY

In view of this, the embodiments of the present disclosure provide a switching device and a packet discarding method, so as to rapidly acquire a discarded message.

In order to achieve the purpose, the technical solution of the embodiments of the present disclosure is implemented as follows.

According to a first aspect of the embodiments of the present disclosure, a switching device is provided, which may include at least one functional unit and a number of ports, wherein the ports are configured to input messages to the at least one functional unit, or receive messages from the at least one functional unit and forward the received messages; the switching device may further include a discarded message collection processing unit, wherein the discarded message collection processing unit may include:

a collection component, configured to collect messages discarded by each functional unit and port.

In an exemplary embodiment, the discarded message collection processing unit may further include:

a tag addition component, configured to add a discarding tag into each discarded message, wherein the discarding tag is configured to point to the functional unit and port which discard the discarded message; and a sending component, configured to send each discarded message added with the discarding tag to specified monitoring equipment.

In an exemplary embodiment, the discarding tag may be an outer-layer Vlan tag set in the discarded message.

In an exemplary embodiment, the monitoring equipment may be a local monitoring port of the switching device or remote monitoring equipment.

In an exemplary embodiment, the discarded message collection processing unit may further include an encapsulation component; and the encapsulation component may be configured to encapsulate each discarded message added with the discarding tag and send each encapsulated message to the sending component.

In an exemplary embodiment, the switching device may further include a number of discarded packet counters; and each discarded packet counter may correspond to one functional unit and one port corresponding to the functional unit, and may be configured to record the number of packets discarded by the functional unit corresponding to the discarded packet counter and the port corresponding to the functional unit.

According to a second aspect of the embodiments of the present disclosure, a packet discarding method for a switching device is provided, which may include that:

messages discarded by each functional unit and port in the switching device are collected.

In an exemplary embodiment, the method may further include that:

a discarding tag is added into each discarded message, wherein the discarding tag is configured to point to the functional unit and port which discard the discarded message.

In an exemplary embodiment, the discarding tag may be an outer-layer Vlan tag set in the discarded message.

In an exemplary embodiment, the method may further include that:

discarded packet counting is performed on each functional unit in a switch chip and each port corresponding to the functional unit, wherein a counted number acquired by the discarded packet counting is used for preliminarily analyze reasons for discarding the packets.

In an exemplary embodiment, the packet discarding method may further include that: each discarded message added with the discarding tag is sent to a local monitoring port or remote monitoring equipment.

In an exemplary embodiment, before the step that each discarded message added with the discarding tag is sent to the remote monitoring equipment, the method may further include that:

each discarded message added with the discarding tag is encapsulated.

Compared with the method adopted in the related art, the switching device and packet discarding method of the embodiments of the present disclosure have the advantages that the messages are not directly discarded, while instead, the discarded messages are not relayed and forwarded any longer and meanwhile, the discarded messages are collected to facilitate subsequent check of the discarded messages, so that manpower and/or material resources for querying the discarded messages in massive messages are greatly saved.

DETAILED DESCRIPTION OF THE EMBODIMENTS

The technical solution of the present disclosure will be further described below with reference to the drawings of the Specification and specific embodiments in detail.

First Embodiment

A switching device of the embodiment includes at least one functional unit and a number of ports, wherein the ports are configured to input messages to the at least one functional unit, or receive messages from the at least one functional unit and forward the received messages; the switching device further includes a discarded message collection processing unit, wherein the discarded message collection processing unit includes:

a collection component, configured to collect messages discarded by each functional unit.

According to the switching device in the embodiment, when it is necessary to discard messages, the messages are not directly discarded like the related art, while instead, processing such as relaying and forwarding may not be performed on the discarded messages and meanwhile, the discarded messages are collected by the discarded message collection processing unit, thereby facilitating subsequent searching for the discarded messages.

A specific structure of the discarded message collection processing unit may be a logic circuit or integrated processing chip coupled with each functional unit. The discarded message collection processing unit may further include a processor and a storage medium, wherein the storage medium is configured to store or cache the messages discarded by each functional unit. As an exemplary embodiment, software or firmware may also be stored in the storage medium. The processor runs the software or the firmware to automatically collect the messages discarded by each functional unit. The processor may be a Central Processing Unit (CPU), a single-chip microcomputer, a digital processor, a programmable logic array or the like.

Figure 1:
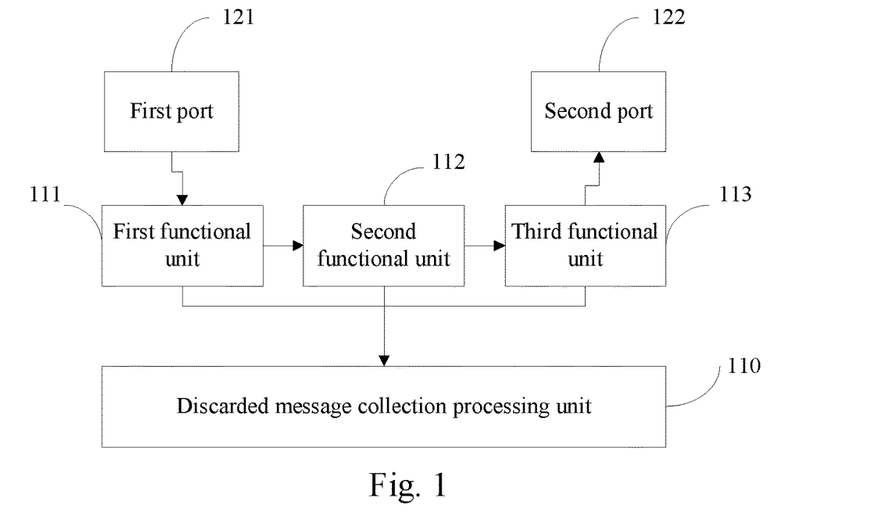
FIG. 1 is a first structure diagram of a switching device according to a first embodiment of the present disclosure.

As shown in FIG. 1, the switching device of an exemplary embodiment includes a first functional unit 111, a second functional unit 112, a third functional unit 113, a first port 121, a second port 122 and the discarded message collection processing unit 110.

The discarded message collection processing unit 110 is coupled with each of the first functional unit 111, second functional unit 112 and third functional unit 113 of the switching device, thereby conveniently receiving the messages discarded by each functional unit. The embodiment is described under the condition that the switching device includes three functional units as an example, and in a specific implementation process, the switching device may include even more functional components.

The switching device may be equipment including a switch chip capable of implementing a switching technology, such as a switch. The functional units may be message analysis units, access control units, forwarding units and traffic monitoring processing units. The message analysis units are configured to analyze messages input into the switching device and acquire information such as input port numbers of the switching device. The access control units are configured to execute various access control operation on the messages. The forwarding units forward the messages received from the input ports to the next node, wherein the node may be network relay equipment, destination equipment or the like. The traffic monitoring processing units are configured to monitor traffic of the messages according to a traffic monitoring strategy. In a specific implementation process, the switching device may further include other functional units, which will not be elaborated herein.

Figure 2:
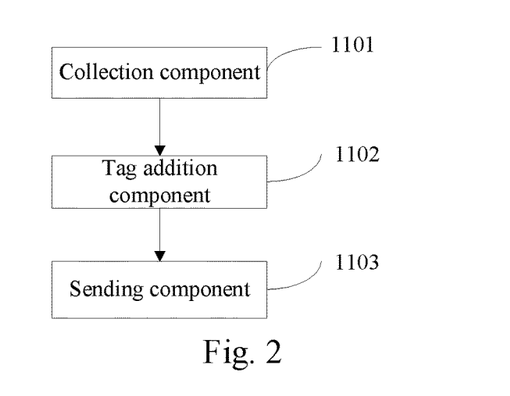
FIG. 2 is a structure diagram of a discarded message collection processing unit according to a first embodiment of the present disclosure.

As a further improvement of the embodiment, the embodiment provides an exemplary structure of the discarded message collection processing unit, and specifically as shown in FIG. 2, the discarded message collection processing unit may include:

a collection component 1101, configured to collect the messages discarded by each functional unit;

a tag addition component 1102, configured to add a discarding tag into each discarded message, wherein the discarding tag is configured to point to the functional unit and port which discard the discarded message; and a sending component 1103, configured to send each discarded message added with the discarding tag to specified monitoring equipment.

A specific physical structure of the collection component 1101 may be a receiving interface, configured to receive the discarded messages from each functional unit. The monitoring equipment may be a local monitoring port of the switching device or remote monitoring equipment. The remote monitoring equipment may be a Personal Computer (PC), monitoring server, network management equipment or the like in a network.

A specific physical structure of the tag addition component 1102 may be a message modification device, configured to add a discarding tag into each message. In an exemplary embodiment, the discarding tags may be a special identifier sequence added to the body or header of each discarded message, and specifically, an outer-layer Vlan tag may be added to each discarded message, or a source Media Access Control (MAC) address in the header of each discarded message may be modified into an identification address of the functional unit and port which discard the message, and the like. In the embodiment, the outer-layer Vlan tag may preferably be added to the discarded message, so that original contents of the discarded message can be preserved, and directly adding the outer-layer Vlan tag can be rapidly and conveniently implemented. The outer-layer Vlan tags can be directly analyzed during subsequent analysis on reasons for discarding these packets. The discarding tag may specifically include N bits, wherein the first n1 bits indicate the functional unit which discards the message and the latter N-n1 bits indicate the port number of the port which discards the messages or the first n1 bits correspond to the port number and the latter N-n1 bits correspond to the functional unit, where n1 is smaller than N. A value of N may specifically be 8, 16 or 32, and may be determined according to the number of the functional units of the switching device and the number of the ports. For example, a discarding tag may include 16 bits, the first 8 bits point to the functional unit which discards the corresponding message and the latter 8 bits indicate the port number.

In such a manner, during packet discarding reason diagnosis, the functional processing during which the messages are discarded in the switching device and the ports which discard the discarded messages can be clearly known through the discarding tags, and then can be mapped to packet discarding strategies of each functional unit to analyze reasons for discarding these messages.

A specific structure of the sending component 1103 may include a sending antenna, a sending interface or a data line. When it is necessary to send a message to external equipment (such as the remote monitoring equipment), the sending component may be the sending antenna or the sending interface. The sending antenna is usually applied to wireless switching equipment, and the sending interface may be a network interface such as RJ45. When the sending component 1103 is only required to send a message to the local monitoring port in the switching device, the sending component 1103 may be the data line.

The discarded message collection processing unit may further include an encapsulation component; and the encapsulation component is configured to encapsulate each discarded message which is about to be sent to the remote monitoring equipment and added with the discarding tag and send each encapsulated message to the sending component. When the discarded message collection processing unit includes the encapsulation component, each discarded message added with the discarding tag may be encapsulated according to an encapsulation protocol so as to be conveniently transmitted to the remote equipment. In the embodiment, the encapsulation component preferably encapsulates each discarded message added with the discarding tag according to an SFLOW format.

In a specific implementation process, the switching device usually includes at least one CPU and a structure such as a sending interface coupled with the CPU. The discarded message collection processing unit may reuse the CPU for message encapsulation and reuse the sending interface for message sending.

The discarded message collection processing unit added with the tag addition component and the sending component not only can provide specific contents of the messages discarded by the switching device for the external equipment or a user, but also can provide specific components and specific ports which discard the messages, so that specific reasons for message discarding can be conveniently determined according to a known packet discarding strategy in a packet discarding diagnosis process, and difficulty in acquiring the contents of the discarded messages and the reasons for discarding these packets is reduced.

Furthermore, the switching device in the embodiment may further include a number of discarded packet counters; and each discarded packet counter corresponds to one functional unit and one port corresponding to the functional unit, and is configured to record the number of packets discarded by the functional unit corresponding to the discarded packet counter and the port corresponding to the functional unit.

If the switching device includes 10 functional units and 20 ports, the ports are divided into input ports and output ports, wherein the input ports are usually configured to acquire messages from the outside of the switching device; and the output ports are configured to receive and forward messages processed by the functional units to corresponding external equipment. In practical implementation, one functional unit may correspond to a number of ports, and one port may correspond to a number of functional units. If each functional unit is coupled with or corresponds to 2 ports, 20 discarded packet counters are correspondingly required to count the discarded messages. If each functional unit corresponds to 3 ports, 30 discarded packet counters are correspondingly required for counting.

If functional unit 5 corresponds to 2 input ports and 1 output port, the 2 input ports are input port 1 and input port 2, and 3 discarded packet counters are correspondingly required for discarded packet counting. The first discarded packet counter counts messages discarded by both functional unit 5 and input port 1, the second discarded packet counter counts messages discarded by both functional unit 5 and input port 2; and the third discarded packet counter counts messages discarded by both functional unit 5 and the output port.

In such a manner, a management personal or the user can know the specific ports corresponding to the specific functional units which discard the messages by reading counts of the discarded packet counters and preliminarily diagnoses the reasons for discarding these packets according to the packet discarding strategies of each functional unit and the messages output by the corresponding ports, so that the management personal or the user can rapidly and preliminarily diagnose the reasons for discarding these packets according to the discarded packet counters.

Figure 3:
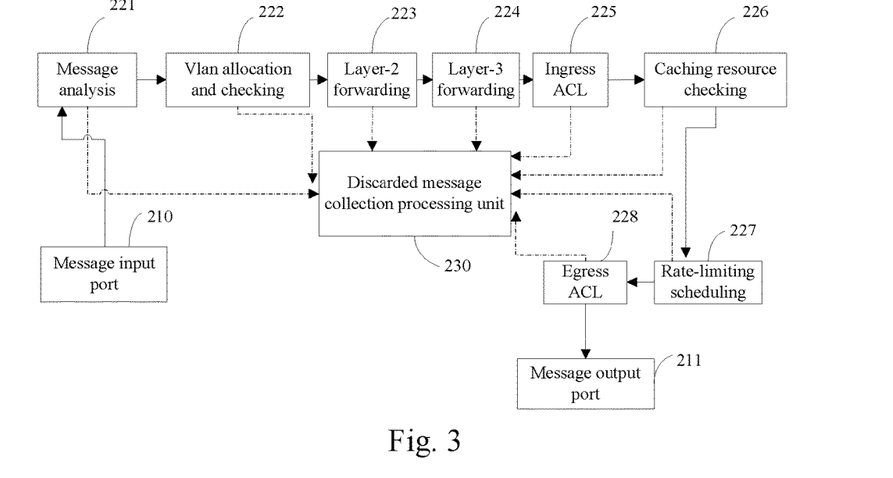
FIG. 3 is a second structure diagram of a switching device according to a first embodiment of the present disclosure.

FIG. 3 is a specific structure diagram of a switching device according to the embodiment. The switching device includes 8 functional units, sequentially a message analysis unit 221, a Vlan allocation and checking unit 222, a layer-2 forwarding unit 223, a layer-3 forwarding unit 224, an ingress Access Control List (ACL) unit 225, a caching resource checking unit 226, a rate-limiting scheduling unit 227 and an egress ACL unit 228. The switching device further includes a message input port 210, a message output port 211 and a discarded message collection processing unit 230. In FIG. 3, solid arrows indicate transmission directions of messages in each functional unit, and dotted arrows indicate transmission directions of messages discarded by the switching device.

The discarded message collection processing unit 230 collects the messages discarded by each functional unit, so that a management personal and a user can conveniently query the discarded messages. In addition, the collection processing unit 230 further adds a discarding tag in each message according to the specific functional unit and specific port which discard this message, wherein the discarding tag points to the functional unit and port which discard the discarded message.

Figure 4:
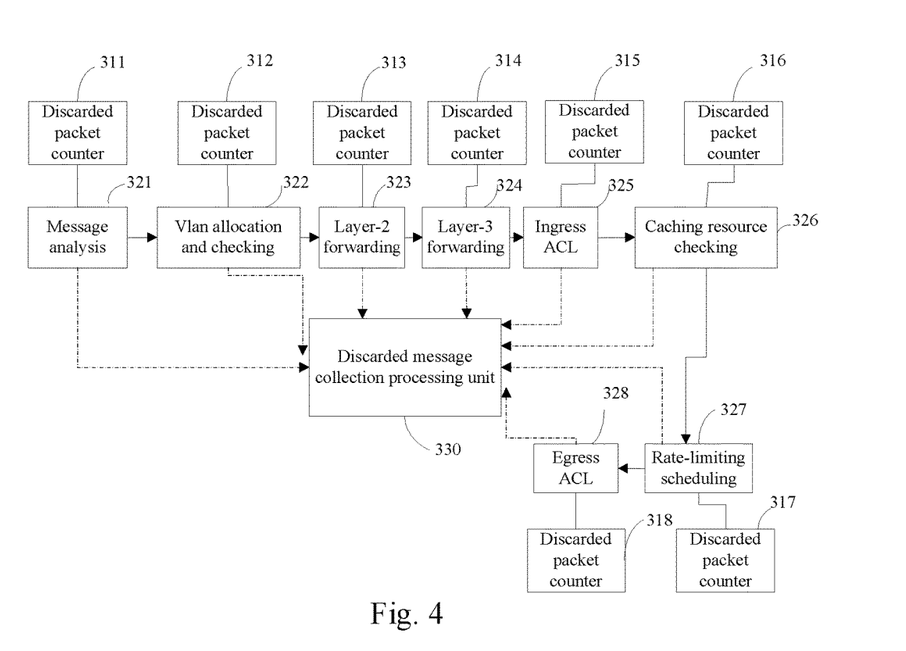
FIG. 4 is a third structure diagram of a switching device according to a first embodiment of the present disclosure.

FIG. 4 is a specific structure diagram of a switching device according to the embodiment. The switching device includes 8 functional units, sequentially a message analysis unit 321, a Vlan allocation and checking unit 322, a layer-2 forwarding unit 323, a layer-3 forwarding unit 324, an ingress ACL unit 325, a caching resource checking unit 326, a rate-limiting scheduling unit 327 and an egress ACL unit 328. The switching device further includes a discarded message collection processing unit 330, a discarded packet counter 311, a discarded packet counter 312, a discarded packet counter 313, a discarded packet counter 314, a discarded packet counter 315, a discarded packet counter 316, a discarded packet counter 317 and a discarded packet counter 318. The discarded packet counter 311 is coupled with the message analysis unit 321. The discarded packet counter 312 is coupled with the Vlan allocation and checking unit 322. The discarded packet counter 313 is coupled with the layer-2 forwarding unit. The discarded packet counter 314 is coupled with the layer-3 forwarding unit 324. The discarded packet counter 315 is coupled with the ingress ACL unit. The discarded packet counter 316 is coupled with the caching resource checking unit 326. The discarded packet counter 317 is coupled with the rate-limiting scheduling unit 327. The discarded packet counter 318 is coupled with the egress ACL unit. In FIG. 4, solid arrows indicate transmission directions of messages in each functional unit, and dotted arrows indicate transmission directions of messages discarded by the switching device.

The discarded message collection processing unit 330 is configured to collect the messages discarded by each functional unit, add a discarding tag in each collected message and forward the message to local or remote monitoring equipment, and the discarded packet counters are configured to count the messages discarded by the ports corresponding to each functional unit to conveniently and rapidly preliminarily diagnose reasons for discarding these packets.

For example, the switching device includes an ingress Vlan unit and port 1. The ingress Vlan unit is configured to detect whether a message is a message of VLAN1 or not. If port 1 does not belong to VLAN1, a message input into the ingress Vlan unit through port 1 is discarded by the ingress Vlan unit. In the embodiment, the discarded message collection processing unit collects the message and adds a discarding tag into the message. The discarding tag may specifically be, for example, (0x00.01.00.01), wherein 0x indicates hexadecimal notation, the first 00.01 points to the ingress Vlan unit and the latter 00.01 points to port 1.

If local message acquisition and packet discarding diagnosis need to be performed, the messages added with the discarding tags are sent to a local monitoring port, and the local monitoring port may be coupled with the local monitoring equipment to further send the messages to the local monitoring equipment. If remote local message acquisition and packet discarding diagnosis need to be performed, the discarded messages are forwarded to the remote monitoring equipment after being added with the discarding tags, and are specifically forwarded to, for example, remote monitoring equipment with an Internet Protocol (IP) address of 10.10.10.1.

Compared with a switching device adopted in the related art, such as a switch, the switching device in the embodiment is added with hardware such as the discarded message collection processing unit and the discarded packet counters, so that subsequent acquisition of the contents of the discarded messages and packet discarding reason diagnosis are facilitated. During packet discarding diagnosis, the functional units and ports which discard the messages can be directly acquired from the discarding tags without querying multiple table entries of the switching device, and the functional units and ports which discard the messages are indirectly determined by comparing and excluding the functional units and ports without processing records about the discarded messages, so that packet discarding can be diagnosed more conveniently.

Second Embodiment

The embodiment provides a packet discarding method for a switching device, which includes that:

a discarded message collection processing unit in the switching device collects messages discarded by each functional unit and port in the switching device.

According to the packet discarding method for the switching device in the embodiment, messages are not directly discarded, while instead, processing such as relaying and forwarding may not be performed on the discarded messages, and meanwhile, the switching device may further collect and store the discarded messages, so that a user or a management personal can subsequently view the discarded messages conveniently, the phenomenon that massive messages are searched for the discarded messages is avoided, and query and acquisition of the discarded messages are simplified.

Figure 5:
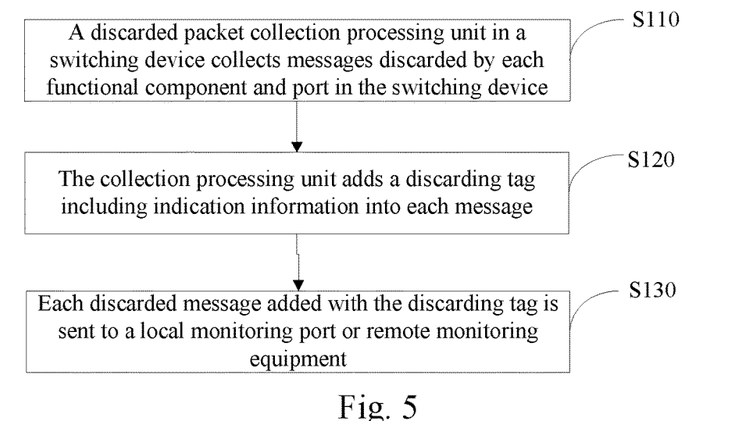
FIG. 5 is a flowchart of a packet discarding method for a switching device according to a second embodiment of the present disclosure.

As shown in FIG. 5, a packet discarding method for a switching device in the embodiment includes:

Step S110: a discarded message collection processing unit in the switching device collects messages discarded by each functional unit and port in the switching device; and Step S120: the collection processing unit adds a discarding tag including indication information into each message, wherein the discarding tag is configured to point to the functional unit and port which discard the discarded message.

According to the packet discarding method in the embodiment, the messages are not directly discarded without switching processing such as relaying or forwarding, while instead, when the messages are discarded, the messages are stored to facilitate subsequent acquisition of the messages discarded by the switching device. In addition, the discarding tags are added into the discarded messages, and reasons for discarding these packets can be rapidly and conveniently diagnosed according to the functional units and ports which are pointed by in the discarding tags and discard the corresponding messages and a packet discarding strategy of the switching device.

According to the packet discarding method of the embodiment, attentions are not only paid to the packet discarding strategy, and are also paid to convenient and rapid acquisition of the discarded messages and diagnosis of the reasons for discarding these packets after packet discarding.

The discarding tag may be an outer-layer Vlan tag set in the discarded message. The outer-layer Vlan tag may be a message header directly added outside the message, and with adoption of such outer-layer Vlan tag, original contents of the discarded message can be saved, so that the original contents and formats of the messages can be completely saved to facilitate subsequent direct application of the messages after the outer-layer Vlan tags are directly stripped. Furthermore, adding the outer-layer Vlan tags can be rapidly and conveniently implemented The method may further include that:

discarded packet counting is performed on each functional unit in a switch chip and each port corresponding to the functional unit, wherein structures for discarded packet counting may be discarded packet counters. Each discarded packet counter corresponds to one functional unit and the port corresponding to the functional unit. The discarded packet counters are configured to preliminarily analyze the reasons for discarding these packets.

The packet discarding method further includes Step S130:

Step S130: each discarded message added with the discarding tag is sent to a local monitoring port or remote monitoring equipment. Sending the messages added with the discarding tags to the local monitoring port or the remote monitoring equipment brings convenience to the local monitoring port or monitoring equipment to rapidly position the specific functional units and ports which discard the corresponding messages in the switching device.

Before each discarded message added with the discarding tag is sent to the remote monitoring equipment, the method may further include that: each discarded message added with the discarding tag is encapsulated. There are multiple formats for encapsulating the messages, and in the embodiment, an SFLOW format is preferably adopted for encapsulation, so that the remote monitoring equipment may conveniently analyze the messages by virtue of an SFLOW technology to acquire contents of the messages and packet discarding information.

An example of another packet discarding method is provided below, specifically as follows:

Step 1: messages are input into a switch chip from ports of the switch chip, and various message processing is performed through each functional unit in the switch chip;

Step 2: if the messages are required to be discarded in the processing of each functional unit in the switch chip, counts of discarded packet counters corresponding to the functional units and the ports of the messages to be discarded by the functional units are updated;

Step 3: the messages are discarded, and a discarded message collection processing unit receives the discarded messages from the functional units and ports which discard the messages and stores the received messages;

Step 4: the discarded message collection processing unit adds discarding tags to the discarded messages according to the functional units and ports which discard the messages, wherein adding the discarding tags may specifically be implemented by, for example, adding different outer-layer Vlan tags to the messages or modifying source MAC addresses of the messages;

Step 5: the discarded message collection processing unit transmits (such as mirroring sampling) the messages added with the discarding tags to a local monitoring port of the switch chip or send the messages to remote monitoring equipment for message analysis, wherein a user can acquire the messages for direct analysis through the local monitoring port of the switch chip, and can position the specific functional units and specific ports, which discard the messages, of the switch chip through the discarding tags contained in the messages; if remote analysis is required, the messages are mirrored and sampled to a CPU in the switch chip, and Step 6 is executed;

Step 6: the CPU encapsulates the messages in an SFLOW message encapsulation manner, and then sends the messages to specified remote monitoring equipment (such as a client or network management equipment or a monitoring server), wherein the remote monitoring equipment may be configured in advance, and for example, an IP address of the remote monitoring equipment is stored in advance; in addition, a sending port for sending the messages added with the discarding tags may also be preset; and Step 7: the user analyzes contents of the messages at a client by adopting SFLOW software, and can analyze the specific functional units and specific ports which discard the messages through the discarding tags contained in the messages.

The discarding tags may specifically be special identifiers added into bodies or headers of the discarded messages.

Compared with a packet discarding method adopted in the related art, the packet discarding method for the switching device in the embodiment has the advantages that the problem that attentions are only paid to how the messages are discarded while acquisition of the contents of the discarded messages and analysis on the reasons for discarding these packets after packet discarding are neglected is improved, and at the same time of packet discarding, the discarded message collection processing unit in the switching device collects and stores the discarded messages, and the discarding tags for positioning the functional units and ports which discard the messages are added into the discarded messages, so that positions where the messages are discarded can be conveniently determined to analyze the reasons for discarding these packets faster in a packet discarding analysis process.

According to the embodiments provided by the present disclosure, it should be understood that the disclosed equipment and method may be implemented in another manner. The equipment embodiment described above is only schematic, and for example, division of the units is only logic function division, and during practical implementation, another division manner may be adopted, for example: multiple units or components may be combined, or may be integrated into another system, or some characteristics may be neglected, or may not be executed. In addition, coupling, or direct coupling or communication connections between each displayed or discussed component may be indirect coupling or communication connections implemented through some interfaces, equipment or units, and may be of electrical, mechanical or other forms.

The units described above as separate parts may be, or may not be physically separated, and the parts displayed as units may be, or may not be physical units, that is, they may be located in the same place, and may also be distributed on multiple network units; and part of or all the units may be selected to achieve the purpose of the solution of the embodiment according to a practical requirement.

In addition, each functional unit in each embodiment of the present disclosure may be integrated in the same processing unit, and may also be used as an independent unit, and two or more than two units may also be integrated in one unit; and the integrated units may be implemented in a hardware form, and may also be implemented in form of combining hardware and software functional units.

Those skilled in the art should understand that: all or part of the steps implementing the method embodiment may be implemented through related hardware instructed by a program, the program may be stored in a computer-readable storage medium, and when the program is executed, the steps of the method embodiment are executed; and the storage medium includes: various media capable of storing program codes such as mobile storage equipment, a Read-Only Memory (ROM), a Random Access Memory (RAM), a magnetic disk or a compact disc.

Or, if being implemented in form of software functional component and sold or used as independent products, the integrated units of the present disclosure may also be stored in a computer-readable storage medium. Based on such an understanding, the technical solution of the embodiment of the present disclosure substantially or the part thereof with contributions to the related art may be embodied in form of software product, and the computer software product is stored in a storage medium, including a plurality of instructions to enable a piece of computer equipment (which may be a PC, a server, network equipment or the like) to execute all or part of the method in each embodiment of the present disclosure. The storage medium includes: various media capable of storing program codes such as mobile storage equipment, a ROM, a RAM, a magnetic disk or a compact disc.

The above is only the specific implementation mode of the present disclosure and not intended to limit the scope of protection of the present disclosure, and any variations or replacements apparent to those skilled in the art within the technical scope of the present disclosure shall fall within the scope of protection of the present disclosure. Therefore, the scope of protection of the present disclosure should be the scope of protection of the claims.

What is claimed is:

1. A switching device, comprising at least one functional unit, a number of ports, a discarded message collection processing unit and multiple discarded packet counters, wherein
the ports are configured to input messages to the at least one functional unit, or receive messages from the at least one functional unit and forward the received messages;
the discarded message collection processing unit comprises a hardware processor, a storage medium and a sending component, wherein
the hardware processor is configured to execute program components stored on the storage medium, wherein the program components comprise:
a collection component, configured to collect messages discarded by each functional unit and port; a tag addition component, configured to add a discarding tag into each discarded message, wherein the discarding tag is configured to point to the functional unit and port which discard the discarded message;
the sending component, configured to send each discarded message added with the discarding tag to specified monitoring equipment;
each discarded packet counter of the multiple discarded packet counters corresponds to one functional unit and one port corresponding to the functional unit, and is configured to record the number of packets discarded by the functional unit corresponding to the discarded packet counter and the port corresponding to the functional unit.

2. The switching device as claimed in claim 1, wherein the discarding tag is an outer-layer Virtual Local Area Network (Vlan) tag set in the discarded message.

3. The switching device as claimed in claim 2, wherein the monitoring equipment is a local monitoring port of the switching device or remote monitoring equipment.

4. The switching device as claimed in claim 3, wherein the discarded message collection processing unit further comprises: an encapsulation component, configured to encapsulate each discarded message added with the discarding tag and send each encapsulated message to the sending component.

5. The switching device as claimed in claim 1, wherein the monitoring equipment is a local monitoring port of the switching device or remote monitoring equipment.

6. The switching device as claimed in claim 5, wherein the program components further comprises: an encapsulation component, configured to encapsulate each discarded message added with the discarding tag and send each encapsulated message to the sending component.

7. A packet discarding method for a switching device, the method comprising:
collecting, by a switching device, messages discarded by each functional unit and port in the switching device, wherein the switching device comprise at least one functional unit and a number of ports;
adding, by the switching device, a discarding tag into each discarded message, wherein the discarding tag is configured to point to the functional unit and port which discard the discarded message;
sending, by the switching device, each discarded message added with the discarding tag to a local monitoring port or remote monitoring equipment;
performing, by the switching device, discarded packet counting on each functional unit and each port corresponding to the functional unit, wherein a counted number acquired by the discarded packet counting is used for preliminarily analyze reasons for discarding the packets.

8. The method as claimed in claim 7, wherein the discarding tag is an outer-layer Virtual Local Area Network (Vlan) tag set in the discarded message.

9. The method as claimed in claim 7, before sending each discarded message added with the discarding tag to the remote monitoring equipment, further comprising:
encapsulating each discarded message added with the discarding tag.

* * * * *